United States Patent
Mantri et al.

(10) Patent No.: US 10,175,963 B2
(45) Date of Patent: Jan. 8, 2019

(54) METHOD FOR EXECUTING A CODE SEQUENCE ON A SECURITY MODULE

(71) Applicant: GIESECKE & DEVRIENT GMBH, München (DE)

(72) Inventors: Deepen Mantri, München (DE); Jörn Treger, Rosenheim (DE); Christian Dönges, Freising (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 147 days.

(21) Appl. No.: 15/303,364

(22) PCT Filed: Apr. 7, 2015

(86) PCT No.: PCT/EP2015/000730
§ 371 (c)(1),
(2) Date: Oct. 11, 2016

(87) PCT Pub. No.: WO2015/158419
PCT Pub. Date: Oct. 22, 2015

(65) Prior Publication Data
US 2017/0031665 A1 Feb. 2, 2017

(30) Foreign Application Priority Data
Apr. 15, 2014 (DE) ......................... 10 2014 005 605

(51) Int. Cl.
*G06F 9/44* (2018.01)
*G06F 8/41* (2018.01)
(Continued)

(52) U.S. Cl.
CPC ............ *G06F 8/443* (2013.01); *G06F 8/4434* (2013.01); *G06F 8/65* (2013.01); *G06F 9/45508* (2013.01)

(58) Field of Classification Search
None
See application file for complete search history.

(56) References Cited

U.S. PATENT DOCUMENTS 6,952,820 B1 * 10/2005 Schultz ................. G06F 8/4436
717/146

FOREIGN PATENT DOCUMENTS

EP 1709534 B1 11/2008
EP 1920328 B1 10/2012

OTHER PUBLICATIONS

Bizzotto et al., "Practical Java Card Bytecode Compression," RENPAR'14/ASF/SYMPA, Hamamet, Tunesia, Apr. 10-13, 2002, pp. 1-6.
(Continued)

*Primary Examiner* — Qamrun Nahar
(74) *Attorney, Agent, or Firm* — Workman Nydegger

(57) ABSTRACT

A method is provided for executing a code sequence on a security module. The code sequence comprises codes to be replaced and codes to be interpreted. A temporary replacement takes place of a respective code to be replaced by a partial code sequence that comprises at least one code having an interpretable code value. The replacement taking place is dependent on the code value of the code to be replaced. An interpretation of the codes to be interpreted in the code sequence and in the partial code sequence takes place with the aid of interpretation information for code values. During the replacement step, the partial code sequence for the code value of the code to be replaced is additionally produced in dependence on a piece of selection information.

10 Claims, 3 Drawing Sheets

(51) Int. Cl.
   *G06F 9/455*     (2018.01)
   *G06F 8/65*      (2018.01)

(56) References Cited

OTHER PUBLICATIONS

Clausen et al., "Java Bytecode Compression for Low-End Embedded Systems," ACM Transactions on Programming Languages and Systems, May 2000, pp. 471-489, vol. 22, No. 3.
"Python Functions," URL: https://www.tutorialspoint.com/python/python_functions.htm, downloaded on Jan. 29, 2015.
Saougkos et al., "Revisiting Java Bytecode Compression for Embedded and Mobile Computing Environments," IEEE Transactions on Software Engineering, Jul. 2007, pp. 478-496, vol. 33, No. 7.

* cited by examiner

ITab

| Bytecode | Address | Number of parameters | |
|---|---|---|---|
| 00 | Fkt0 | 1 | |
| 01 | Fkt1 | 0 | |
| 02 | Fkt2 | 2 | |
| ⋮ | ⋮ | ⋮ | C2 |
| 70 | Fkt70 | 0 | |
| 71 | prop_Fkt1 | 1 | |
| ⋮ | ⋮ | ⋮ | |
| 79 | prop_Fkt9 | 0 | |
| 81 | 0 | 9 | |
| 82 | (AI:) 1, 3 | 9 | C1 |
| ⋮ | ⋮ | ⋮ | |
| 99 | (AI:) 2, 2 | 9 | |

| C1 | Replace |
|---|---|
| 81 | ▢▢▢▢▢ — CS' |
| 82 | ▢▢▢ — CS' |
| ⋮ | |

FIG. 3

METHOD FOR EXECUTING A CODE SEQUENCE ON A SECURITY MODULE

BACKGROUND

The present invention relates to a method for executing a code sequence on a security module. Further, the present invention relates to a corresponding security module and to a method and a device for producing a code sequence on a security module.

It is known from the background art to compress, on a security module, a code sequence to be interpreted. In the document G. Bizzotto et al., "Practical Java Card bytecode compression," RENPAR'14/ASF/SYMPA, Hamamet, Tunesia, 10-13 Apr. 2002 is described the compression of JavaCard bytecode using instructions that are not used in the JavaCard specification.

The document EP 1 709 534 B1 describes a method for the execution of a program by a virtual machine with the aid of a code interpreter that is maintained and used in different versions.

In document EP 1 920 328 B1, a method for executing an application on a portable data carrier is described in which operation code languages are switched between by switching between different operation code tables.

The known methods for compressing code or for executing compressed code have the disadvantage that the compression has a preset configuration and cannot be flexibly adapted, for example to conditions on a security module.

The objective of the present invention is to flexibly store a code sequence on a security module and to interpret it accordingly.

SUMMARY

The method according to the present invention serves to execute a code sequence on a security module, the code sequence comprising codes to be replaced and codes to be interpreted. In a step a) of the method, a respective code to be replaced is temporarily replaced by a partial code sequence, the partial code sequence comprising at least one code having an interpretable code value. Here, the replacement takes place in dependence on the code value of the code to be replaced. In a step b), the codes to be interpreted in the code sequence and in the partial code sequence are interpreted with the aid of interpretation information for code values.

The method according to the present invention is characterized in that, in the above replacement step, the partial code sequence for the code value of the code to be replaced is produced not only in dependence on the code value, but also in dependence on a piece of selection information.

Here, the method according to the present invention has the advantage that, through a suitable definition of a piece of selection information, codes to be replaced can be flexibly defined for corresponding partial code sequences. In particular, the code to be replaced is compressed, that is, it is smaller than the partial code sequence by which the code to be replaced is replaced. In this way, storage space can be saved on the security module.

The security module on which the code sequence is executed can be configured in various ways. The security module is preferably a hardware security module. In particular, the security module can be a portable data carrier that preferably can be used in a terminal device. Likewise, the security module can be permanently built into a terminal device. The security module is thus preferably one or more of the following components: a SIM/USIM card (SIM=subscriber identity module, USIM=universal subscriber identity module), a microSD card, a USB token (USB=universal serial bus), a chip card, an RFID module (RFID=radio frequency identification), a TPM module (TPM=trusted platform module), an NFC module (NFC=near field communication), an embedded SIM module, a TEE environment (TEE=trusted execution environment as defined in the GlobalPlatform specification).

The piece of selection information used in the method according to the present invention can be configured in different ways. In one variant, different partial code sequences are producible for the same code value in dependence on the piece of selection information. Likewise, the piece of selection information can be configured in such a way that it selects one of multiple replacement rules for codes to be replaced.

In a further embodiment of the method according to the present invention, the code sequence comprises, in addition to the codes, parameters and/or the piece of selection information itself. Here, the piece of selection information can comprise a piece of position selection information that indicates at which position in the partial code sequence a respective parameter of the code sequence is to be inserted. Preferably, the piece of selection information is the piece of position selection information, that is, the piece of selection information consists only of the piece of position selection information. The piece of position selection information is preferably included in the replacement rule described above or, if applicable, also in the interpretation information, e.g. in a corresponding interpreter table.

In a further preferred variant, the piece of selection information is associated with the code sequence and depends on:

what the code sequence belongs to, for example whether the code sequence belongs to the operating system, to a library, or to an application or applet on the security module;

and/or which memory location in the security module the code sequence is stored at, especially whether the code sequence is stored in the ROM, in a nonvolatile memory, in a directory or in a security domain on the security module;

and/or which application and/or which packet and/or which method the code sequence belongs to;

and/or which code publisher the code sequence originates from, especially whether the code sequence originates from the manufacturer of the security module, from the publisher of the security module or from unknown third parties;

and/or which security level the code sequence is assigned to, that is, in which certificate hierarchy the code sequence lies.

In a further embodiment of the method, codes to be interpreted comprise code values that are specified in a code specification, whereas codes to be replaced comprise code values unused in the code specification. Here, the code specification can be, for example, a JavaCard specification, with, in this case, a Java virtual machine running on the security module. The code values of the code specification can be, for example, bytecodes and especially JavaCard bytecodes.

In a further embodiment of the method, codes to be interpreted in the code sequence and/or codes in the partial code sequence comprise proprietary code values that are not used in a code specification and that are interpreted by means of the interpretation information. In contrast to the above-defined unused code values that can be used for codes to be replaced, the proprietary code values are directly interpretable by means of the interpretation information without the intermediate step of replacement.

In addition to the above-described method for executing a code sequence, the present invention further comprises a security module having a code sequence stored thereon, the code sequence comprising codes to be replaced and codes to be interpreted, the security module being set up to execute the above-described inventive method for executing the code sequence, or one or more preferred variants of said method.

Furthermore, the present invention relates to a method for producing a code sequence on a security module, the code sequence comprising codes to be replaced and codes to be interpreted. Here, the code sequence is generated from partial code sequences, each having at least one code having an interpretable code value, and from codes to be interpreted, and is stored on the security module. The method is characterized in that a piece of selection information is defined such that, in executing the code sequence on the security module, codes to be replaced are temporarily replaced by respective partial code sequences in dependence on the piece of selection information.

The method just described is preferably configured in such a way that the code sequence produced hereby can be executed with the above-described method according to the present invention for executing the code sequence, or one or more preferred variants of said method.

Furthermore, the present invention relates to a device for producing a code sequence on a security module, the code sequence comprising codes to be replaced and codes to be interpreted, the device being configured for executing the above-described method for producing a code sequence, or one or more preferred variants of said method.

BRIEF DESCRIPTION OF THE DRAWINGS

Exemplary embodiments of the present invention are described in detail below by reference to the attached drawings.

Shown are:

FIG. 2 an interpreter table that can be used in executing the code sequence from FIG. 1;

FIG. 3 a decompression table that can be used in executing the code sequence from FIG. 1.

DETAILED DESCRIPTION OF VARIOUS EMBODIMENTS

Figure 1:
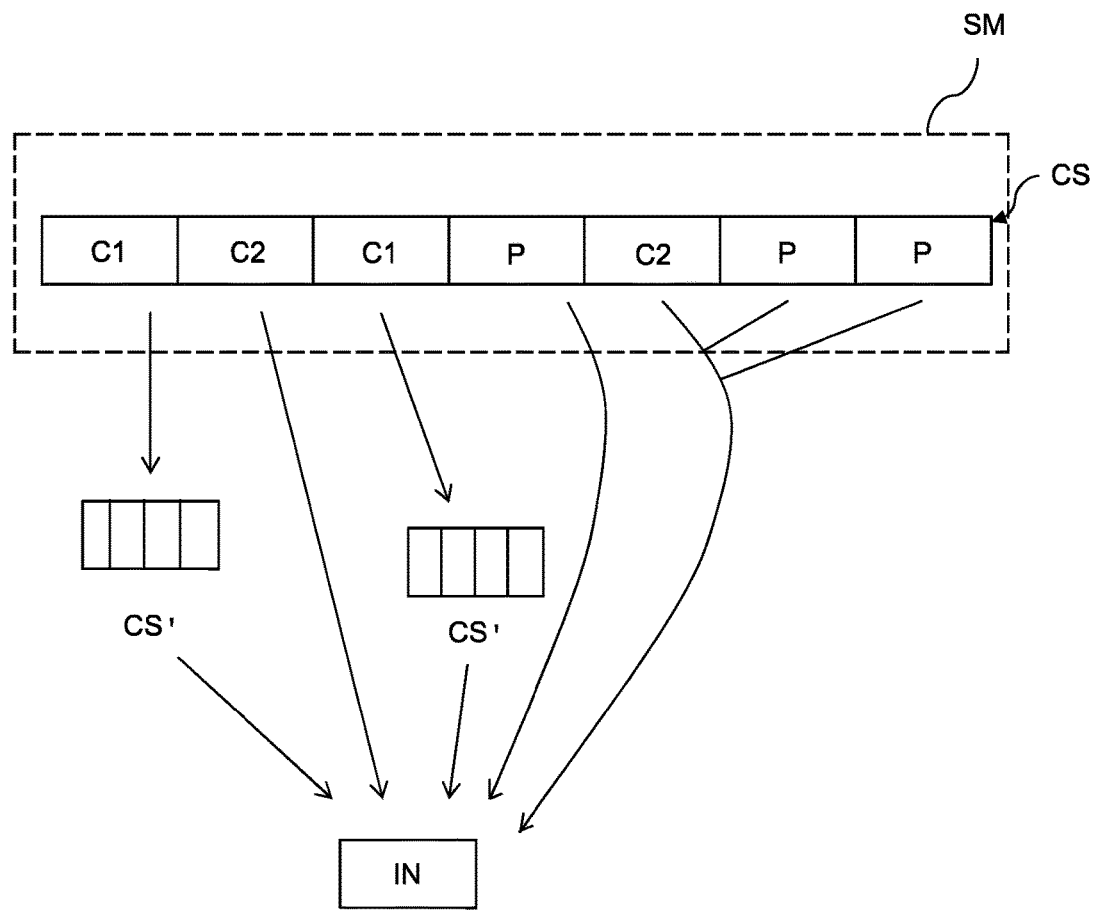
FIG. 1 a schematic depiction of the execution of a code sequence composed of JavaCard bytecodes based on one variant of the method according to the present invention.

The method according to the present invention is explained below by way of example by reference to a security module SM in the form of a chip card. The security module is depicted merely schematically by a dotted rectangle in FIG. 1. The chip card representing the security module is a so-called JavaCard, which a virtual machine uses for executing code sequences composed of JavaCard bytecodes. Here, the bytecode examples mentioned below originate from the JavaCard specification.

The code sequence CS to be executed, composed of sequential codes C1 and C2 and parameters P associated with the codes, is located on the security module SM. Here, the codes C1 constitute codes to be replaced as defined in the claims. Similarly, the codes C2 constitute codes to be interpreted as defined in the claims. Despite the use of the same reference signs, the codes C1, or their code values, and the codes C2, or their code values, are different. The respective codes C1 and C2 can be associated with one or more parameters P or, if applicable, also with no parameters. To the extent that one or more parameters are associated with a code in the code sequence CS, in FIG. 1, said parameters follow the respective code in the direction left to right.

In the context of executing the code sequence CS, the codes to be interpreted C2 and the associated parameters P (if present) are given without change to an interpreter IN, which is a component of the security module SM. Here, the codes C2 are bytecodes that are defined in the JavaCard specification and with which predetermined functions can be executed. If applicable, the codes C2 can additionally also comprise proprietary bytecodes that are not defined in the JavaCard specification and with which proprietary functions are associated. This will become evident from the interpreter table IN in FIG. 2 described below.

In contrast to the codes to be interpreted C2, in executing the code sequence CS, the codes to be replaced C1 are temporarily replaced by respective partial code sequences CS' that each include code that is interpretable by the interpreter IN. For this, the partial code sequences CS' are transferred to the interpreter IN. In the exemplary embodiment described here, the codes to be replaced C1 are compressed compared with the respective partial code sequences that replace them, such that storage space is saved on the security module SM.

The partial code sequences CS' transferred to the interpreter IN, as well as the codes C2, are interpreted by means of an interpreter table. One example of such an interpreter table is shown in FIG. 2. In the first column, the interpreter table ITab according to FIG. 2 specifies, for example, the bytecodes 00 to 79, which are used in the codes to be interpreted C2. Here, the bytecodes 00 to 70 are defined in the JavaCard specification. In contrast to this, the bytecodes 71 to 79 are proprietary bytecodes that are not used in the JavaCard specification. In the second column of the interpreter table ITab, "Address," the bytecodes 00 to 70 are associated with functions Fct0 to Fct70, which are defined in the JavaCard specification. The bytecodes 71 to 79, in contrast, are associated with proprietary functions prop_Fct1 to prop_Fct9. Further specified in the right column of the interpreter table ITab are the number of respective parameters belonging to the bytecodes, which are required in the context of interpreting the bytecodes.

Further, the lower part of the interpreter table ITab includes the bytecodes 81 to 99 for the respective codes to be replaced C1, these being free bytecodes that are not used in the JavaCard specification. For said codes, in the column "Address," instead of functions, pieces of selection information AI are specified that determine how parameters are to be inserted into the decompressed code sequences CS'. In order for the interpreter to recognize that the bytecodes 81 to 99 refer to codes to be replaced C1 that must be decompressed prior to their interpretation, this is indicated in the right column by the value 9 for the number of parameters.

According to FIG. 2, the bytecode 82 has the piece of selection information "1, 3," which means that the sole parameter of said bytecode is to be inserted into the decompressed code sequence CS' at the position 3. Associated with the bytecode 99, in contrast, is the piece of selection information "2, 2," which indicates that the two parameters of the bytecode are to be inserted into the decompressed code sequence CS' at the position 2. Unlike the bytecodes 82 and 99, no parameters belong to the bytecode 81, which is indicated in the second column of the interpreter table by the value "0". Also the value "0" constitutes a piece of selection information, which defines that no parameter is to be inserted into the code sequence CS'.

For temporarily replacing the bytecodes 81 to 99 by corresponding code sequences CS', a decompression table DC is used that is indicated as an excerpt in FIG. 3. Here, for each of the bytecodes 81 to 99, the decompressed code sequence CS' is defined in the column "Replace." The respective parameters (if present) are then inserted into said code sequence at the specified positions based on the associated piece of selection information AI. Said code sequence can then be processed by the interpreter IN.

According to the above-described example, for codes to be replaced, a piece of selection information AI is defined in each case that is a piece of position selection information that specifies the position in the code sequence CS' of parameters to be inserted. Instead of a piece of position selection information, the piece of selection information can also define a selected replacement rule (especially a decompression table) of multiple replacement rules. Further, the piece of selection information can be defined in dependence on various criteria. For example, the piece of selection information can depend on which logical domain the code sequence is arranged in on the security module SM. The logical domain can especially be defined by the context of the virtual machine in relation to a packet and/or an applet and/or a called method. Further examples of criteria for defining the selection information were mentioned above.

In the above-described exemplary embodiment, the piece of selection information is included in the interpreter table ITab. Nevertheless, if appropriate, the possibility also exists that the piece of selection information is defined in the decompression table DC, which can include for this a further column that includes the piece of selection information in the same way as in the "Address" column in the interpreter table ITab in FIG. 2.

Figure 4:
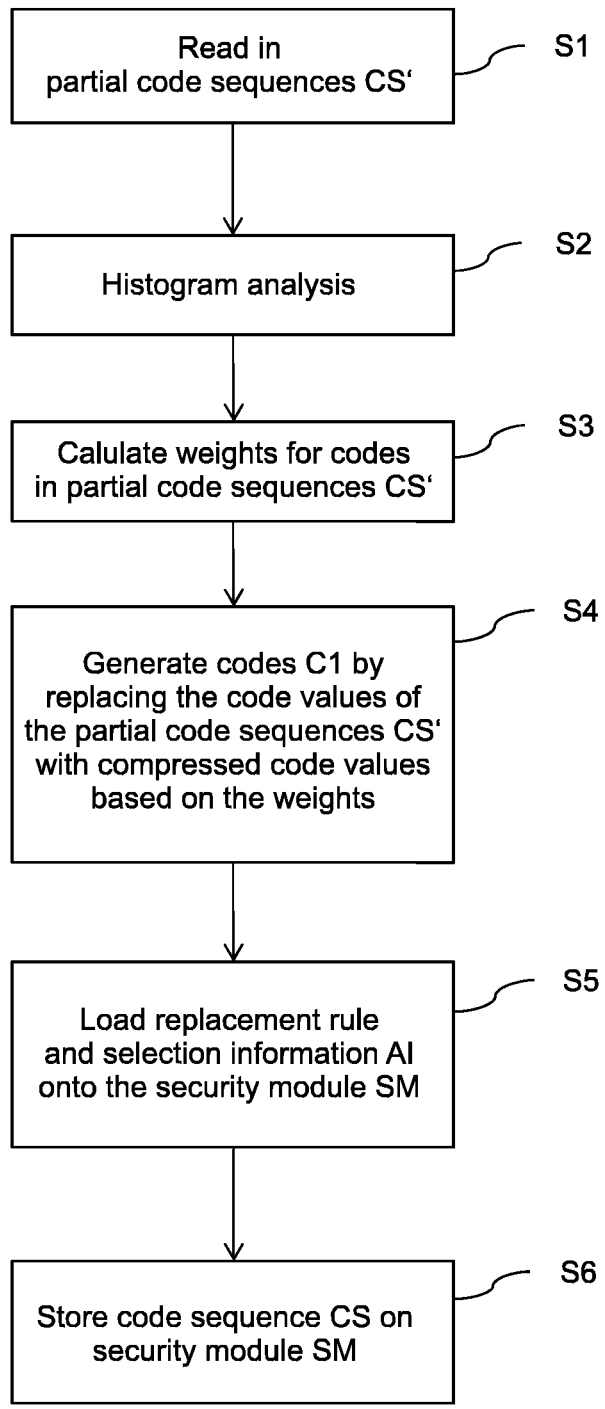
FIG. 4 a flow chart that reflects the production of the code sequence executed in FIG. 1.

A possible type of compression of partial code sequences CS' from FIG. 1 for producing the codes C1 is explained below by reference to FIG. 4. The corresponding decompression processes the piece of selection information AI. As indicated in FIG. 4, in step S1, the partial code sequences CS' to be compressed are first read in. In step S2, a histogram analysis of the partial code sequences CS' is carried out. Here, the frequencies of identical codes in all partial code sequences CS' are identified. In the exemplary embodiment considered here, the codes in the partial code sequences CS' each comprise, from the JavaCard specification, an individual bytecode with which, if applicable, one or more parameters are associated. Such a bytecode is referred to below as a standard bytecode.

In a next step S3, weights for the codes having identical code values occurring in the partial code sequences CS' are determined taking their frequencies into account. Here, the value of a weight is the frequency (that is, the number of occurrences) of the respective code in all partial code sequences multiplied by the number of bytes saved by an appropriately defined free bytecode (that is, a bytecode that is not used in the JavaCard specification) being used as a compressed code (that is, as the code to be replaced C1 according to FIG. 1) for the code in the partial code sequence.

In an exemplary scenario, the bytecode/parameter combination SSPUSH 1024 requires three bytes for its storage. It was found 500 times in the partial code sequences. Said combination is replaced by the free bytecode PROPB207, which needs only one byte of storage space. Thus, a total of two bytes are saved 500 times, which corresponds to a weight of 1,000. In this exemplary scenario, the bytecode/parameter combination BSPUSH 8, in contrast, requires two bytes and was found 800 times in the partial code sequences. Said combination is replaced by the free bytecode PROPB208 having the length of one byte. Thus, the weight 800 results for said combination.

In step S4, the bytecode/parameter combinations in the partial code sequences CS' are replaced in succession, in decreasing order of weight beginning with the highest weight, by corresponding compressed codes. In this way, the codes C1 in the code sequence CS in FIG. 1 are produced. From this replacement of the partial code sequences by compressed codes, a replacement rule is derived that defines the back-replacement from the compressed codes to the codes in the partial code sequences. In the embodiment described here, said replacement rule constitutes a decompression table that associates corresponding decompressed codes in the partial code sequences with compressed codes. In step S5, said decompression table is loaded onto the security module SM together with a piece of selection information AI that specifies the replacement rule to be used. Thereafter, in step S6, the code sequence CS composed of the compressed codes C1, the (uncompressed) codes C2 to be interpreted, and associated parameters P (FIG. 1) are stored on the security module SM. Here, each code C1 is linked with the piece of selection information AI.

Modifications of compression methods are explained below. In one variant, the parameters of the standard bytecodes in a partial code sequence are compressed only partially or not at all. In this case, the frequencies are identified for codes whose code sections match without taking into account the parameters that are not to be compressed. This is explained below by reference to an example.

The following code having associated parameters is considered:
0xBC 0x10 0x20 0x30 0x40.

Here, 0xBC is a standard bytecode, and 0x10, 0x20, 0x30 and 0x40 are four parameters. According to the previously described compression, the occurrence of the complete bytecode/parameter combination in the partial code sequences is sought. In the modification described here, the second parameter 0x20 is not compressed and is considered to be variable. Accordingly, the frequencies of the following bytecode/parameter combinations are identified:
0xBC 0x10 <arbitrary second parameter value>0x30 0x40.

Subsequently, similar to how it is described above, corresponding weights are determined for said code structure. At compression, the code section without the second parameter value is then replaced by a free bytecode. The second parameter value remains as a parameter in the compressed code.

If one considers the following bytecode/parameter combination:
0xBC 0x10 0xAA 0x30 0x40,
said combination is transformed into the following compressed code using the free bytecode 0xEC:

0xEC 0xAA.

If appropriate, also two or more parameters can be considered to be variable and thus remain as parameters in the compressed code. If, for example, one considers the bytecode/parameter combination:
0xBC 0x10 0xAA 0x30 0xBB,
and if the second parameter byte 0xAA and the fourth parameter byte 0xBB are considered to be variable, then the following compressed code could result here from using the free bytecode 0xEC:
0xEC 0xAA 0xBB.

In the above, examples were described for which histograms are produced for identical codes, each having one standard bytecode and its parameters. In the same way, the histogram analysis can, if applicable, also be carried out for connected blocks of multiple standard bytecodes with their parameters. In other words, in this case, a code to be compressed comprises multiple standard bytecodes having associated parameters.

For example, such a code can comprise a standard bytecode having a one-byte parameter, as well as a subsequent standard bytecode without parameters. One example of this is the code "0xC7 XX 0x3B," where 0xC7 and 0x3B are the standard bytecodes and XX is the parameter of the bytecode 0xC7. In the histogram analysis, the parameter XX is then considered to be variable and the following code pattern is thus sought:
0xC7 <arbitrary parameter value>0x3B.

The bytecode combination "0xC7 0x3B" can then be replaced, for example, by the free bytecode PROPB209, which comprises the code value 0xD1. The parameter XX is associated with said bytecode. Accordingly, the bytecode/parameter combination "0xC7 XX 0x3B" is replaced by the code "0xD1 XX".

The above-described embodiments of the present invention comprise a range of advantages. In particular, a very good compression of code sequences in a security module can be achieved, the compression being able to be suitably adapted for respective codes in the code sequence in dependence on arbitrary criteria. This is achieved through the use of selection information.

In an only optional extension of the present solution, in addition to the use of the piece of selection information, multiple interpreter tables and/or decompression tables could be provided. A first group of applets uses a first interpreter table (and/or decompression table) and at least one second applet or one second group of applets uses a corresponding second interpreter table (and/or decompression table). Below, reference is made to the interpreter table without referring in each case to the and/or alternative decompression table. At least the first (and/or the second) interpreter table is used, as previously described in detail with reference to the drawings. The first group of applets is formed by applets loaded in advance (pre-issuance). The second group of applets is formed by applets loaded subsequently (post-issuance). A second interpreter table can be loaded subsequently with an applet. The second interpreter table can thus be applet-specific or specific for a group of applets. The security module stores a group specification for applets, for example the property "subsequently loaded" for applets in a second group. For applets loaded in advance (before the security module is issued to the user), the security module uses the first interpreter table. For applets loaded subsequently (after the security module is issued to the user), the security module uses the second interpreter table or, of multiple second interpreter tables, the second interpreter table associated with the applet.

The invention claimed is:

1. A method for executing a code sequence on a security module, the code sequence comprising codes to be replaced and codes to be interpreted, having the following steps:
   a) temporarily replacing a respective code to be replaced by a partial code sequence that comprises at least one code having an interpretable code value, the replacement taking place in dependence on the code value of the code to be replaced, and
   b) interpreting the codes to be interpreted in the code sequence and in the partial code sequence with the aid of interpretation information for code values;
      wherein in the replacement step, the partial code sequence for the code value of the code to be replaced is additionally produced in dependence on a piece of selection information,
      wherein, for the same code value, different partial code sequences are producible in dependence on the piece of selection information,
      wherein the piece of selection information is associated with the code sequence and is dependent on:
      which code type the code sequence belongs to; and/or
      which memory location in the security module the code sequence is stored at and/or
      which application and/or which packet and/or which method the code sequence belongs to; and/or
      which code publisher the code sequence originates from; and/or
      which security level the code sequence is associated with.

2. The method according to claim 1, wherein the piece of selection information selects one of multiple replacement rules for codes to be replaced.

3. The method according to claim 1, wherein the code sequence comprises parameters and/or the piece of selection information.

4. The method according to claim 3, wherein the piece of selection information comprises a piece of position selection information that indicates at which position in the partial code sequence a respective parameter of the code sequence is to be inserted.

5. The method according to claim 4, wherein the piece of position selection information is included in the replacement rule or the interpretation information.

6. The method according to claim 1, wherein codes to be interpreted comprise code values that are specified in a code specification, and codes to be replaced comprise code values unused in the code specification.

7. The method according to claim 1, wherein codes to be interpreted in the code sequence and/or codes in the partial code sequence comprise proprietary code values that are not used in a code specification and that are interpreted by means of the interpretation information.

8. An apparatus having a code sequence stored thereon, the code sequence comprising codes to be replaced and codes to be interpreted, the security module comprising:
   one or more processors; and
   one or more non-transitory computer-readable media having thereon computer-executable instructions that are structured such that, when executed by the one or more processors, cause the security module to:
a) temporarily replacing a respective code to be replaced by a partial code sequence that comprises at least one code having an interpretable code value, the replacement taking place in dependence on the code value of the code to be replaced, and b) interpreting the codes to be interpreted in the code sequence and in the partial code sequence with the aid of interpretation information for code values;

> wherein in the replacement step, the partial code sequence for the code value of the code to be replaced is additionally produced in dependence on a piece of selection information,
>
> wherein, for the same code value, different partial code sequences are producible in dependence on the piece of selection information,
>
> wherein the piece of selection information is associated with the code sequence and is dependent on:
>
> which code type the code sequence belongs to; and/or
>
> which memory location in the security module the code sequence is stored at and/or
>
> which application and/or which packet and/or which method the code sequence belongs to; and/or
>
> which code publisher the code sequence originates from; and/or
>
> which security level the code sequence is associated with.

9. A method for producing a code sequence on a security module, the code sequence comprising codes to be replaced and codes to be interpreted, and the code sequence being generated from partial code sequences having, in each case, at least one code having an interpretable code value, and from the codes to be interpreted, and being stored on the security module, > wherein a piece of selection information is defined such that, in executing the code sequence on the security module, the codes to be replaced are temporarily replaced by respective partial code sequences in dependence on the piece of selection information,
>
> wherein, for the same code value, different partial code sequences are producible in dependence on the piece of selection information,
>
> wherein the piece of selection information is associated with the code sequence and is dependent on:
>
> which code type the code sequence belongs to; and/or
>
> which memory location in the security module the code sequence is stored at and/or
>
> which application and/or which packet and/or which method the code sequence belongs to; and/or
>
> which code publisher the code sequence originates from; and/or
>
> which security level the code sequence is associated with.

10. A device for producing a code sequence on a security module, the code sequence comprising codes to be replaced and codes to be interpreted, the device being configured for carrying out a method in which the code sequence is generated from partial code sequences having, in each case, at least one code having an interpretable code value, and from the codes to be interpreted, and is stored on the security module, the device comprising:

> one or more processors; and
>
> one or more non-transitory computer-readable media having thereon computer-executable instructions that are structured such that, when executed by the one or more processors, cause the device to:
>
> define a piece of selection information such that, in executing the code sequence on the security module, the codes to be replaced are temporarily replaced by respective partial code sequences in dependence on the piece of selection information,
>
> wherein, for the same code value, different partial code sequences are producible in dependence on the piece of selection information,
>
> wherein the piece of selection information is associated with the code sequence and is dependent on:
>
> which code type the code sequence belongs to; and/or
>
> which memory location in the security module the code sequence is stored at and/or
>
> which application and/or which packet and/or which method the code sequence belongs to; and/or
>
> which code publisher the code sequence originates from; and/or
>
> which security level the code sequence is associated with.

* * * * *